(12) United States Patent
Mao et al.

(10) Patent No.: US 11,633,045 B2
(45) Date of Patent: Apr. 25, 2023

(54) FURNITURE LIGHT-EMITTING ASSEMBLY AND LIGHT-EMITTING SEAT HAVING THE SAME

(71) Applicant: DAKANG HOLDING CO., LTD., Zhejiang (CN)

(72) Inventors: Rujia Mao, Zhejiang (CN); Xiaoyu He, Zhejiang (CN); Guofei Yuan, Zhejiang (CN); Haitao Ouyang, Zhejiang (CN)

(73) Assignee: DAKANG HOLDING CO., LTD., Zhejiang (CN)

( * ) Notice: Subject to any disclaimer, the term of this patent is extended or adjusted under 35 U.S.C. 154(b) by 21 days.

(21) Appl. No.: 17/421,730

(22) PCT Filed: Jan. 2, 2020

(86) PCT No.: PCT/CN2020/070064
§ 371 (c)(1),
(2) Date: Jul. 9, 2021

(87) PCT Pub. No.: WO2021/103281
PCT Pub. Date: Jun. 3, 2021

(65) Prior Publication Data
US 2022/0079345 A1    Mar. 17, 2022

(30) Foreign Application Priority Data
Nov. 28, 2019  (CN) .......................... 201922097252.1

(51) Int. Cl.
*A47C 7/72*  (2006.01)
*F21S 4/28*  (2016.01)
(Continued)

(52) U.S. Cl.
CPC ................ *A47C 7/725* (2013.01); *F21S 4/28* (2016.01); *F21V 23/02* (2013.01); *F21Y 2113/10* (2016.08); *F21Y 2115/10* (2016.08)

(58) Field of Classification Search
CPC .... A47C 7/725; A47C 7/72; F21S 4/28; F21S 4/22; F21S 4/00; F21S 8/00; F21V 23/02;
(Continued)

(56) References Cited

U.S. PATENT DOCUMENTS

2017/0221396 A1*  8/2017  Bertlwieser ............... G09F 9/33
2018/0056637 A1*  3/2018  Liao ...................... B32B 27/304
(Continued)

FOREIGN PATENT DOCUMENTS

CN  201920183  8/2011
CN  206792116  12/2017
(Continued)

OTHER PUBLICATIONS

English Translation of WO2018/078278A1; Vehicle Luminous Glazing; Bauerle et al. (Year: 2018).*
(Continued)

*Primary Examiner* — Jong-Suk (James) Lee
*Assistant Examiner* — Glenn Zimmerman
(74) *Attorney, Agent, or Firm* — JCIP Global Inc.

(57) ABSTRACT

A light-emitting seat, comprising a chair frame, a furniture light-emitting assembly, and a skin layer. The furniture light-emitting assembly comprises a fixing part, a strip light, a light guide material layer, and a power supply assembly. The strip light is disposed on the fixing part, the light guide material layer covers the strip light, and the power supply assembly is electrically connected to the strip light. In addition, the fixing part of the furniture light-emitting assembly may cover the chair frame, and the skin layer covers the chair frame and the furniture light-emitting assembly; or, the fixing part may be disposed on the light guide material layer, and the light guide material layer covers the chair frame, the skin layer covers the chair frame and the furniture light-emitting assembly. And, at least an
(Continued)

area of the skin layer covering the furniture light-emitting assembly is a light-transmitting material.

7 Claims, 3 Drawing Sheets

(51) Int. Cl.
   *F21V 23/02* (2006.01)
   *F21Y 113/10* (2016.01)
   *F21Y 115/10* (2016.01)

(58) Field of Classification Search
   CPC ...... F21V 21/0808; F21V 19/00; F21V 23/00; F21V 29/15; F21Y 2113/10; F21Y 2115/10; G02B 6/00
   See application file for complete search history.

(56) References Cited

U.S. PATENT DOCUMENTS

| | | | | |
|---|---|---|---|---|
| 2019/0328142 | A1* | 10/2019 | Ma | A47C 7/004 |
| 2021/0231272 | A1* | 7/2021 | Bianchi | F21V 7/005 |

FOREIGN PATENT DOCUMENTS

| | | | | |
|---|---|---|---|---|
| CN | 108652308 | | 10/2018 | |
| CN | 208827673 | | 5/2019 | |
| CN | 208972995 | | 6/2019 | |
| CN | 110432680 | | 11/2019 | |
| DE | 202013011905 | U1 * | 11/2014 | ............... F21S 4/22 |
| DE | 102017113380 | A1 * | 12/2018 | ............... F21K 9/61 |
| JP | 2019111960 | A * | 7/2019 | ............... B60N 2/90 |
| WO | WO-2014026888 | A1 * | 2/2014 | ............... F21S 4/22 |
| WO | WO-2018078278 | A1 * | 5/2018 | ....... B32B 17/10036 |
| WO | WO-2019211748 | A1 * | 11/2019 | ............... F21S 4/22 |

OTHER PUBLICATIONS

English Translation of DE102017113380A1; Film Construction With Generation of Visible Light by Means of LED Technology; Baeck, J; (Year: 2018).*

English Translation of DE-202013011905-U1; lighting arrangement; no inventor name given; (Year: 2014).*

English Translation of WO2014026888; Production of a Strip-Shaped Lighting Module; Reiss et al. (Year: 2014).*

"International Search Report (Form PCT/ISA/210) of PCT/CN2020/070064," dated Aug. 20, 2020, pp. 1-5.

* cited by examiner

FURNITURE LIGHT-EMITTING ASSEMBLY AND LIGHT-EMITTING SEAT HAVING THE SAME

CROSS-REFERENCE TO RELATED APPLICATION

This application is a 371 of international application of PCT application serial no. PCT/CN2020/070064, filed on Jan. 2, 2020 which claims the priority benefit of China application no. 201922097252.1 filed on Nov. 28, 2019. The entirety of each of the above mentioned patent applications is hereby incorporated by reference herein and made a part of this specification.

BACKGROUND

Technical Field

The invention relates to the field of furniture manufacturing, and particularly to, a furniture light-emitting assembly and a light-emitting seat having the same.

Description of Related Art

With the vigorous development of the e-sports industry, various peripheral products related to e-sports emerge in large quantities. To pursue great game experience, professional e-sports players and most game players particularly demand the atmosphere and visual effects of entire games. With such demand, e-sports chairs came into being.

In addition to the pursuit of ultimate performance, those various e-sports related products launched on the market have a certain pursuit of cool and dazzling appearance. The disclosed patent with publication number CN108652308A discloses a seat with side strip lights, including a seat body and a side strip light module. The side strip lights are disposed along the outer edge curve of the cushion portion of the seat body or the outer edge curve of the seat body, and the visual effect of the gaming chair is enhanced through the light emission of the side strip light module, thereby satisfying the pursuit of cool and dazzling effects of the users. However, direct light emission through the side strip lights may fail to produce soft light, cause less visual comfort due to chronic exposure, and have poor visual effects, so the overall gaming chair appears not to be high-end. In addition, currently the light-emitting seat all require the installation of side strip lights on the finished chairs, which consumes a lot of manpower to install the side strip lights on each light-emitting seat and causes low production efficiency.

SUMMARY

In view of the defects and problems in the related art, the invention provides a furniture light-emitting assembly adapted for various soft-packed furniture, capable of emitting light in any shape in any position of the soft-packed furniture product, and having advantages of emitting soft light and providing great visual comfort and good visual effect. In addition, the furniture light-emitting components can be customized according to the size of the furniture for mass production. The produced furniture light-emitting assembly can be directly installed in related furniture, which greatly improves production efficiency.

The invention also provides a light-emitting seat having the furniture light-emitting assembly.

According to an embodiment of a first aspect of the present invention, the furniture light-emitting assembly includes a fixing part, a strip light, a light guide material layer, and a power supply assembly. The strip light is disposed on the fixing part. The light guide material layer covers the strip light. The power supply assembly is electrically connected to the strip light. The light guide material layer covers the strip light, and light is refracted through the light guide material layer to form soft light. Compared with the strip light disposed on the chair frame, the strip light disposed on the fixing part has the following advantage that the strip light can be disposed on the fixing part in any shape, its design shape is flexible, and because the fixing part has elasticity, when the human body sits in the front and back of the sear, the light will change from light to dark, which enhances the consumer's experience. The power supply assembly is connected to the strip light to supply electric energy. The power supply assembly may be a power cord connected to the power source or a component that can provide electric energy separately. Since this component is usually used in movable furniture, lithium batteries are usually used for power components.

Preferably, the furniture light-emitting assembly further includes a heat insulation layer. The heat insulation layer is made of a transparent or semi-transparent material and is disposed between the strip light and the light guide material layer. The heat insulation layer has heat resistance, which prevents a direct contact between the strip light and the light guide material layer, thereby preventing the safety hazards caused by the heat of the strip light to the light guide material layer and preventing the lamp beads on the strip light from contacting the light guide material layer after the lamp beads are heated, which the contact may taint the lamp beads.

Preferably, the fixing part and the heat insulation layer are integrally formed to cover the strip light and are respectively located at the lower end and the upper end of the strip light. The fixing part and the heat insulation layer have the same material having certain heat resistance, which can prevent the safety hazards caused by the heat generated on the backside of the strip light to the furniture. Materials used to perform the integral formation process can be one material or two stitched materials.

Preferably, the strip light is selected from one or more of RGB light strips and LED light strips.

Preferably, the light guide material layer is selected from one or more of foams, EVA foams, and EPE foams.

Preferably, the material of the fixing part is selected from one or more of non-woven fabrics and PVC.

Preferably, the material of the heat insulation layer is selected from one or more of non-woven fabrics and PVC.

Preferably, the strip light can emit at least two colors of light, so the light-emitting seat becomes more colorful as a whole and the needs of different users can be met.

Preferably, the light guide material layer has various colors and may have combinations of color light when combined with the strip light to meet the needs of different users.

Preferably, the furniture light-emitting assembly further includes a control panel, which can receive a signal to control the color and sequence of light emitted by the strip light.

According to an embodiment of the second aspect of the present invention, a light-emitting seat having the furniture light-emitting assembly includes a chair frame, the furniture light-emitting assembly and a skin layer. The fixing part in the furniture light-emitting assembly covers the chair frame, the skin layer covers the chair frame and the furniture light-emitting assembly, and at least an area of the skin layer covering the furniture light-emitting assembly is light-transmitting material.

According to an embodiment of the second aspect of the present invention, a light-emitting seat having the furniture light-emitting assembly includes a chair frame, the furniture light-emitting assembly and a skin layer. The fixing part is disposed on the light guide material layer. The light guide material layer covers the chair frame. The skin layer covers the chair frame and the furniture light-emitting assembly, and at least an area of the skin layer covering the furniture light-emitting assembly is light-transmitting material.

Preferably, the light-transmitting material is selected from mesh cloth, silica gel, and transparent plastic.

In the invention, the strip light is covered by the light guide material layer, so light is refracted in the light guide material layer, the light-emitting seat has soft light, great visual comfort, good visual effects, and the seat appears to be high-end. In addition, the furniture light-emitting components can be customized according to the size of the furniture for mass production. The produced furniture light-emitting assembly can be directly installed in related furniture, which greatly improves production efficiency.

DESCRIPTION OF THE EMBODIMENTS

With reference to the drawings, a furniture light-emitting assembly according to a first embodiment of the invention is illustrated in the following paragraphs.

Figure 1:
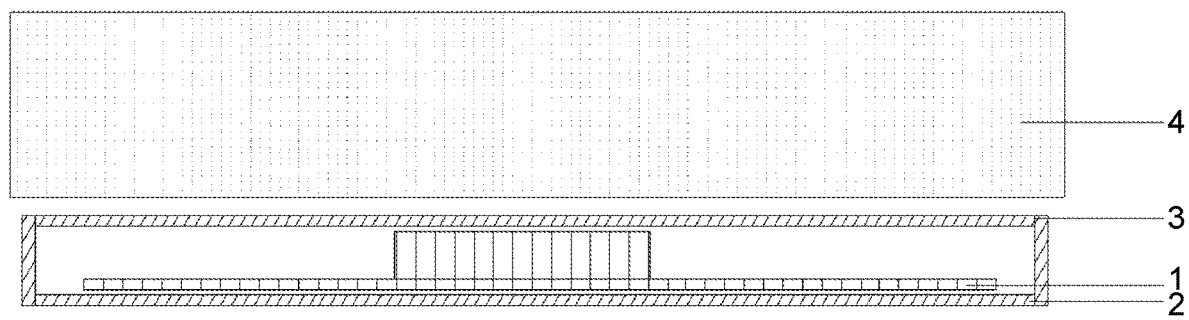
FIG. 1 is a schematic view of a furniture light-emitting assembly according to an embodiment of the invention.
Figure 3:
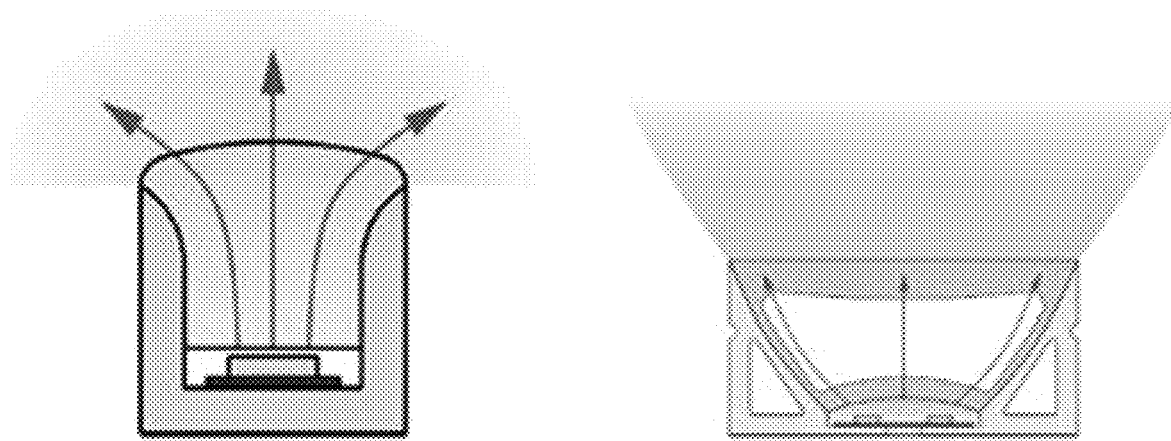
FIG. 3 illustrates a contrast between light of a strip light and light of a strip light covered with a light guide material layer.

As shown in FIG. 1, in the embodiment of the invention, the furniture light-emitting assembly includes a strip light 1, a fixing part 2, a heat insulation layer 3, a light guide material layer 4, and a power supply assembly. The heat insulation layer 3 is made of a transparent or semi-transparent material, and the strip light 1 is disposed on the fixing part 2 either by gluing a backside of the strip light 1 onto the fixing part 2 or by stitching the fixing part 2 and the light guide material layer 4 together to fix the strip light 1. Compared to the method of fixing the strip light with transparent glue in the related art, the two methods can prevent the glue from falling off during the heating process. The strip light 1 is flexible, so the strip light 1 is disposed on the fixing part 2 in any shape. The heat insulation layer 3 covers the strip light 1, and the heat insulation layer 3 has heat resistance, which prevents a direct contact between the strip light 1 and the light guide material layer 4, thereby preventing the safety hazards caused by the heat of the stirp light 1 to the light guide material layer 4 and preventing the lamp beads on the strip light 1 from contacting the light guide material layer 4 after the lamp beads are heated, which the contact therebetween may taint the lamp beads. The light guide material layer 4 covers the heat insulation layer 3, and as shown in FIG. 3, light is refracted through the light guide material layer to form soft light. The soft light effect is even more significant when the distance between the strip light 1 and the light guide material layer 4 is greater than 15 mm. The power supply assembly is connected to the strip light to supply energy, the power supply assembly can be a power cord connected to a power supply or an assembly that can independently provide energy, and the power supply assembly usually adopts lithium batteries since the assembly is usually used in movable furniture.

As shown in FIG. 1, the fixing part 2 and the heat insulation layer 3 are integrally formed to cover the strip light and respectively are located at the lower end and the upper end of the strip light 1. The fixing part 2 and the heat insulation layer 3 have the same material having certain heat resistance, which can prevent the safety hazards caused by the heat generated on the backside of the strip light to the furniture.

The strip light 1 can emit at least two colors of light, and the light guide material layer has various colors and may have combinations of color light when combined with the strip light. Moreover, the strip light 1 can control the color and the sequence of the light emitted in each area and whether to emit light or not through a control panel to meet the needs of different users.

The strip light is an RGB light strip or an LED light strip, and the light guide material layer is foams, EVA foams, or EPE foams. The material of the heat insulation layer is non-woven fabric or PVC, and the material of the fixing part is non-woven fabric or PVC.

Figure 2:
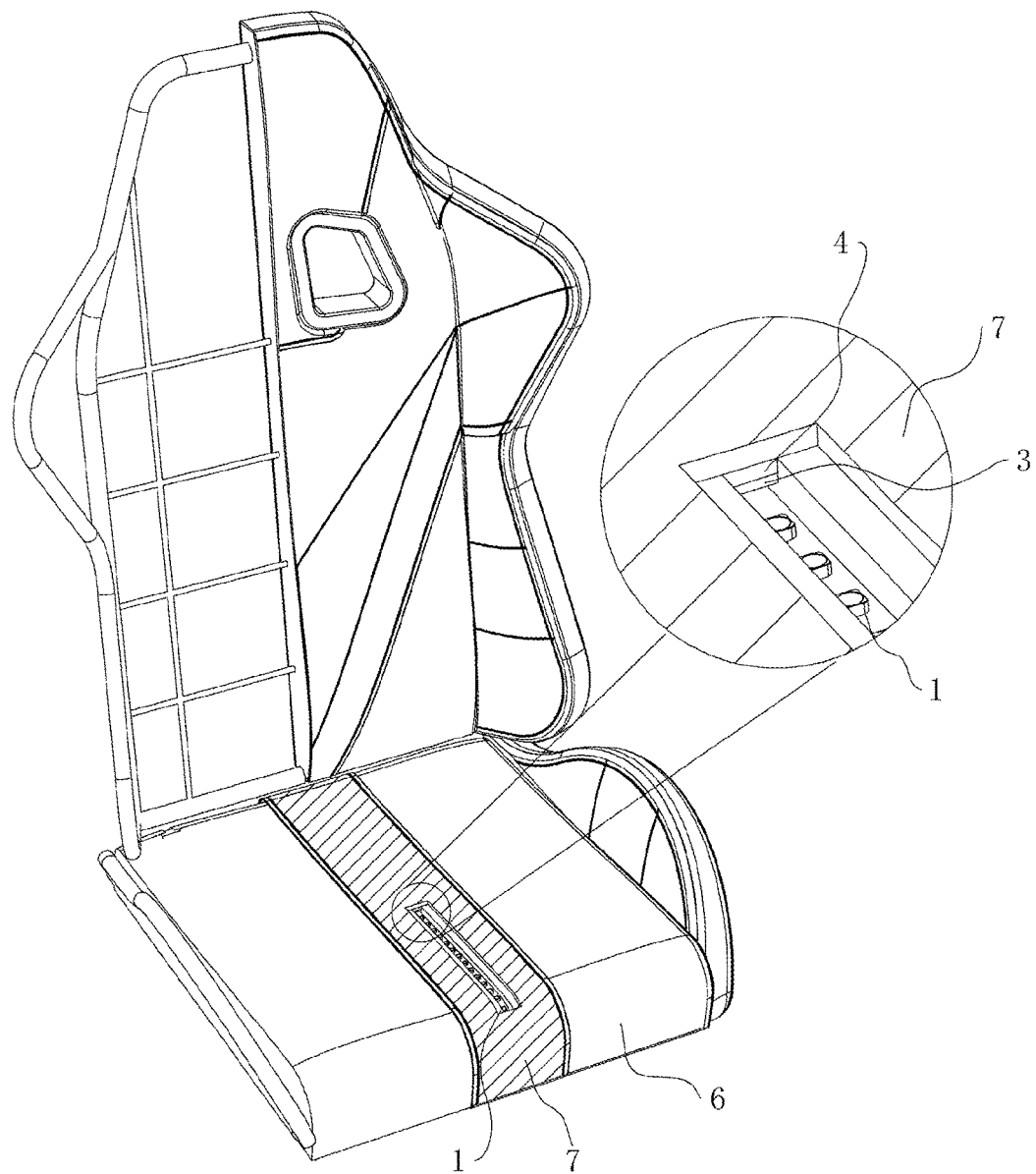
FIG. 2 is a seat having the furniture light-emitting assembly according to the embodiment of the invention.
Figure 4:
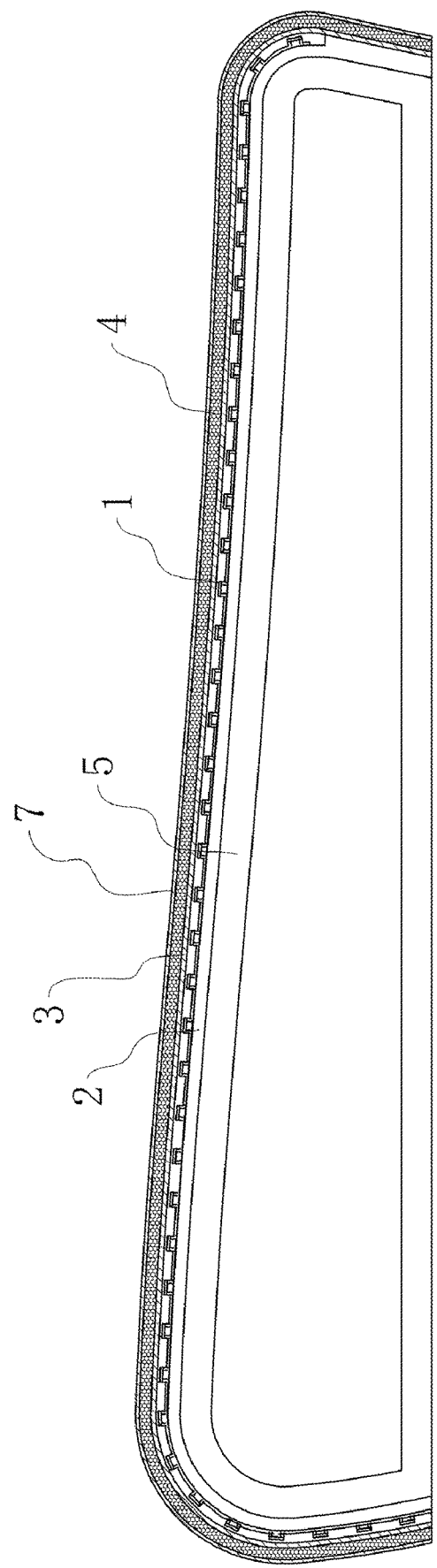
FIG. 4 is a cross-sectional view of the light-emitting seat in FIG. 2.

FIG. 2 illustrates a light-emitting seat according to an embodiment of the invention. FIG. 4 is a cross-sectional view of the light-emitting seat in FIG. 2. The light-emitting seat having the furniture light-emitting assembly includes a chair frame 5, the furniture light-emitting assembly, and a skin layer 6. The fixing part 2 and the heat insulation layer are integrally formed, and the fixing part 2 and the light guide material layer 4 are stitched together to fix the strip light 1. Moreover, the light guide material layer 4 covers the outside of the chair frame, the skin layer 6 covers outside of the chair frame 5 and the furniture light-emitting assembly, the material of at least the area 7 of the skin layer 6 covering the furniture light-emitting assembly is a light-transmitting material, and the light-transmitting material is selected from mesh cloth, silica gel, and transparent plastic. It is noted that the light-transmitting part 7 of the skin layer 6 in FIG. 2 is partially removed simply to properly and clearly illustrate the internal structure of the light-emitting seat, while the skin layer 6 actually covers the outside of the chair frame 5 and the furniture light-emitting assembly without the opening in FIG. 2.

In the above embodiments, only several implementation modes of the invention are illustrated, the description is relatively specific and detailed, but note that the description is not intended to limit the patent scope of the invention. It should be pointed out that for those of ordinary skill in the art, without departing from the concept of the invention, several modifications and improvements can be made, and these all fall within the protection scope of the invention. Therefore, the protection scope of the patent of the invention should be subject to the appended claims.

What is claimed is:

1. A light-emitting seat, comprising a chair frame, a furniture light-emitting assembly, and a skin layer, wherein the furniture light-emitting assembly comprises a fixing part, a strip light, a light guide material layer, and a power supply assembly, the strip light is disposed on the fixing part, the light guide material layer covers the strip light, and the power supply assembly is electrically connected to the strip light; and wherein the fixing part of the furniture light-emitting assembly covers the chair frame, the skin layer covers the chair frame and the furniture light-emitting assembly, and at least an area of the skin layer covering the furniture light-emitting assembly is a light-transmitting material.

2. The light-emitting seat according to claim 1, wherein the light-transmitting material comprises mesh cloth, silica gel, or transparent plastic.

3. The furniture light-emitting assembly according to claim 1, further comprising a heat insulation layer, and the heat insulation layer is made of a transparent material or a semi-transparent material and is disposed between the strip light and the light guide material layer.

4. The furniture light-emitting assembly according to claim 1, wherein the strip light comprises RGB light strips or LED light strips.

5. The furniture light-emitting assembly according to claim 1, wherein the light guide material layer comprises foams, Ethylene Vinyl Acetate (EVA) foams, or expanded polyethylene (EPE) foams.

6. The furniture light-emitting assembly according to claim 1, wherein a material of the fixing part comprises non-woven fabrics or Polyvinyl Chloride (PVC).

7. The furniture light-emitting assembly according to claim 3, wherein a material of the heat insulation layer comprises non-woven fabrics or PVC.

* * * * *